Patented Sept. 24, 1940

2,215,859

UNITED STATES PATENT OFFICE 2,215,859

ACID WOOL DYESTUFFS OF THE QUINOXALINE SERIES

Wilhelm Schepss and Otto Bayer, Leverkusen-I. G. Werk, Germany, assignors to General Aniline & Film Corporation, a corporation of Delaware No Drawing. Application May 6, 1937, Serial No. 141,097. In Germany May 12, 1936

1 Claim. (Cl. 260—250)

The present invention relates to sulfonic acids of compounds which may be represented by the general formula:

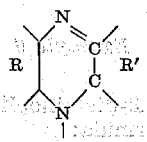

In this formula R stands for an aromatic radical, R' stands for a heterocyclic radical and $x$ for hydrogen, alkyl, oxalkyl, aralkyl, aryl and a radical being connected with R in the o-position with ring formation or suitable substitution products thereof.

The new products are obtainable by causing aromatic o-diamines, one amino group of which is primary and the other primary or secondary, to react upon heterocyclic o-diketones, the derivatives or substitution products thereof, as for instance upon isatin and thionaphthenequinone, and sulfonating the condensation products thus obtained. These products are reddish-brown powders, the salts of which are easily soluble in water. Some of the salts are well crystallized. It is understood that such products, in the molecules of which the mentioned condensation reaction between the said o-diamines and heterocyclic diketones has taken place more than once, fall within the scope of the present invention.

The products according to the present invention are particularly suitable as acid dyestuffs which dye the animal fiber yellowish-brown to brownish-red shades of very good fastness properties especially of a good fastness to light.

The condensation of the said ketones with aromatic o-diamines has been known by different publications, as for instance by Berichte 28, page 2527, and Berichte 34, pages 1108, 2294 and 4014. The quinoxaline derivatives thus prepared could however not be used hitherto in the textile dyeing, as they have neither the character of vat dyestuffs nor are they otherwise of use. It was therefore surprising and could not be foreseen that by introducing sulfonic acid radicals into the molecule dyestuffs are obtained which are distinguished by very good fastness properties, especially by good fastness to light.

The invention is illustrated by the following examples but is not restricted thereto, the parts being by weight.

Example 1

36 parts of 1-aminocarbazole and 30 parts of isatin are boiled for 8 hours with 580 parts of trichlorobenzene with reflux. The solution turns intensely red. The solvent is blown off with steam and the formed condensation product is dried. 40 parts of the same are dissolved in 360 parts of sulfonic acid monohydrate and then 380 parts of 65% oleum are added drop by drop. After 3 hours the mixture is poured on ice, the sulfonic acid is dissolved in alkali, filtered and to the filtrate salt is added to separate the dyestuff. It yields on wool reddish-brown shades which are distinguished by a good evenness, a good fastness to steam, a beautiful color effect also in artificial light, and above all by an excellent fastness to light.

The dyestuff is a sulfonic acid of the compound of the formula:

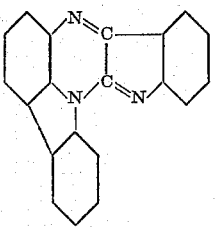

Example 2

The condensation product of the melting point 265° C., obtainable from isatin and 2-aminodiphenylamine in 90% acetic acid, according to Berichte 34, page 4014, is sulfonated in the manner described in Example 1; a monosulfonic acid is obtained, the ammonium salt of which crystallizes very well. This latter goes on wool in red shades of excellent fastness properties.

The dyestuff is a sulfonic acid of the compound of the formula:

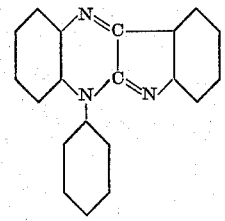

Instead of the isatin also the derivatives thereof, especially those which contain halogen, or naphthisatin and its derivatives, and instead of the 2-aminodiphenylamine also its derivatives, such as 4-ethoxy-2'-aminodiphenylamine can be used.

Example 3

20 parts of 4-nitro-1.2-phenylenediamine and 20 parts of isatin are boiled with 300 parts of 1.2.4-trichlorobenzene for 4 hours with reflux and stirring, whereby condensation takes place under a vigorous elimination of water. The mixture is allowed to cool over night, the product formed is filtered by suction, washed with alcohol and dried. 55 parts of the same are dissolved at room temperature in 180 parts of sulfuric acid monohydrate and the same quantity of 65% oleum is added drop by drop, whereby after a short time the whole becomes soluble in alkali. The mixture is poured on ice, dissolved in alkali and salted out.

The dyestuff obtained dyes wool from an acid bath beautiful clear yellowish-brown shades and is a sulfonic acid of the compound of the formula:

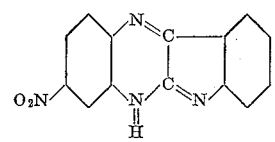

Example 4

10 parts of the compound of the following constitution:

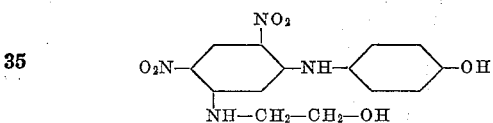

are dissolved in the heat in 100 parts of glacial acetic acid and 10 parts of water, thereto are added with stirring 15 parts of zinc dust. After a short time the two nitro groups are reduced to amino groups. The zinc dust is removed by filtration in the heat and 9.7 parts of isatin and 20 parts of anhydrous sodium acetate are added to the solution. The solution turns brownish-red. After 12 hours' standing the mixture is boiled for 4 hours with reflux in order to complete the condensation. Then the dyestuff solution is poured into water and the dyestuff precipitated by acidifying with mineral acids. It yields brownish-red shades on cotton mordanted with tannic acid. 4 parts of the dyestuff are stirred in the cold into 30 parts of sulfuric acid monohydrate, whereby already after 2 hours solubility in alkali is attained. The solution is poured on ice, hot dissolved with alkali, filtered, whereby no residue may remain, and then precipitated with hydrochloric acid. The dyestuff obtained yields very strong brownish shades on the animal fiber.

The dyestuff is a sulfonic acid of the compound of the probable formula:

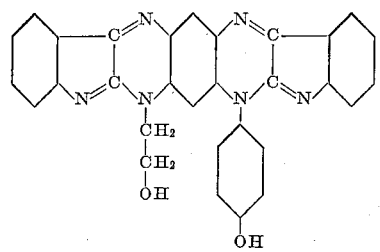

Example 5

8.4 parts of diketodihydro-2.1-naphthothiophene of the formula:

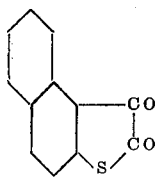

and 7.2 parts of 1-aminocarbazole are boiled for 8 hours with 100 parts of 1.2.4-trichlorobenzene with reflux and stirring. The reaction mixture turns deep brown under elimination of water. After cooling the dyestuff is filtered, washed with alcohol and dried. By treating with sulfonating agents, such as concentrated sulfuric acid, the dyestuff is converted already at room temperature into the sulfonic acid which dyes wool yellowish-brown shades.

Example 6

5.6 parts of 2.3-diaminophenazine dihydrochloride of the formula:

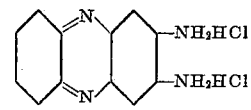

and 2.9 parts of isatin are stirred for some hours with 36 parts of concentrated sulfuric acid at 50° C., whereby the color of the reaction mixture turns from green to reddish-brown. 10 parts of 65% oleum are then added at room temperature, and after stirring for a short time a dyestuff is obtained which is soluble in alkali.

The dyestuff is a sulfonic acid of the compound of the formula:

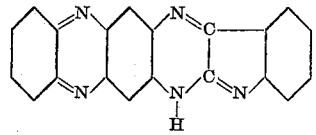

which yields on wool yellow shades of excellent fastness properties.

Example 7

10 parts of 4-chloro-2'-nitrodiphenylamine (obtainable from 4-chloroaniline and o-nitrochlorobenzene) are dissolved in 90 parts of glacial acetic acid and 10 parts of water at the boil, and 12 parts of zinc dust are added. After 2 hours the zinc dust is removed by filtration, 6 parts of isatin are added to the solution and the mixture is boiled with reflux for 30 hours. The formed dyestuff is precipitated by means of water and purified over the well crystallizing chlorhydrate. 3 parts of the latter are stirred with 20 parts of phenetidine at 100° until no further increase of the separated hydrochloric acid can be observed.

By sulfonating a dyestuff is obtained which is a sulfonic acid of the compound of the probable formula:
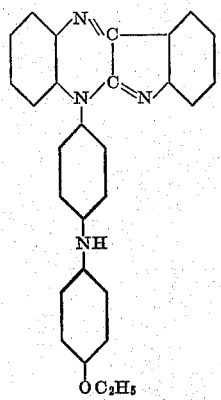
It yields on wool very strong reddish-brown shades of excellent fastness properties.
We claim:
Sulfonic acids of the compound of the formula:
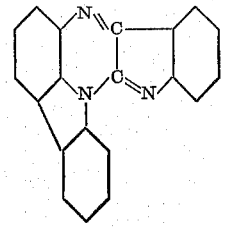
dyeing wool strong reddish-brown shades of excellent fastness to light.
WILHELM SCHEPSS.
OTTO BAYER.